United States Patent

Hanks

(10) Patent No.: US 6,813,231 B1
(45) Date of Patent: Nov. 2, 2004

(54) COMBINED ELECTRONICS CHANNELS IN OPTICAL DISC DRIVE FOR DATA DETECTION DURING READING AND FOR WOBBLE DETECTION DURING WRITING

(75) Inventor: D Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 605 days.

(21) Appl. No.: 09/451,414

(22) Filed: Nov. 30, 1999

(51) Int. Cl.[7] .................................................. G11B 5/69
(52) U.S. Cl. ............................... 369/47.38; 369/59.17; 369/59.19
(58) Field of Search ........................... 369/59.19, 59.17, 369/47.38

(56) References Cited

U.S. PATENT DOCUMENTS

| | | | | |
|---|---|---|---|---|
| 3,761,610 A | * | 9/1973 | Krallinger et al. ............. | 178/6 |
| 4,477,845 A | * | 10/1984 | Mortlock et al. ............. | 360/26 |
| 5,592,345 A | * | 1/1997 | Carobolante et al. .... | 360/73.03 |
| 6,088,311 A | * | 7/2000 | Katoh ......................... | 369/47 |
| 6,201,784 B1 | * | 3/2001 | Maeda .................... | 369/275.3 |
| 6,343,336 B1 | * | 1/2002 | Norton, Jr. et al. .......... | 710/65 |

* cited by examiner

Primary Examiner—Gautam R. Patel
(74) Attorney, Agent, or Firm—Augustus W. Winfield

(57) ABSTRACT

In an optical disc drive, the read channel electronics and the wobble channel electronics are combined into one common channel, for reduced cost. When the drive is reading, the common channel is used for primary data and a read clock. When the drive is writing, the common channel is used for wobble data and a write clock. Two example embodiments are provided. In each example, a single front end amplifier, without automatic gain control, is used. In each example, a single PLL and a single data detector are used.

2 Claims, 4 Drawing Sheets

COMBINED ELECTRONICS CHANNELS IN OPTICAL DISC DRIVE FOR DATA DETECTION DURING READING AND FOR WOBBLE DETECTION DURING WRITING

FIELD OF INVENTION

This invention relates generally to optical discs used for data storage and more specifically to drive electronics used in conjunction with an optical head for detecting data and position information.

BACKGROUND OF THE INVENTION

Drives for optical discs, for example for Compact Discs (CD) and Digital Versatile Discs (DVD), must control the radial position of an optical transducer head in order to follow a track on a disc, must control the distance of the head from a data surface in the disc (focus control), must extract data from a read signal, and may also detect disc tilt. Drives that can write data onto an optical disc must also extract a clock signal used during writing.

For rewritable optical discs, some formats use embossed lands and grooves in the data layer, with the side walls of the grooves following a generally sinusoidal shape. The resulting grooves are called "wobbled" grooves. The wobbled grooves may be used to generate a signal that provides a frequency and phase reference for a clock signal during writing. The frequency of the wobble may be an integer submultiple of the frequency of the write clock signal, or the frequency of the wobble may be higher than the write clock frequency. The walls of the grooves may also be embossed with perturbations that can be used to encode information, such as address information, for example, sector number or block number. In this patent document, the data written by a laser within a groove is called primary data and data that may be embossed onto the wall of a groove is called wobble data.

For one example DVD format, the minimal length of a data mark followed by the minimal length of a gap between marks corresponds to a time period, in the data signal, equal to the time periods of six clock cycles of the read clock. As a result, the signal resulting from reading data marks has a dominant frequency component that is one sixth the frequency of the read clock. In this patent document, the term "primary data frequency" means the dominant frequency in the data signal, not the read clock frequency.

In many optical disc drives, an optical detector has four sections (called a quad detector) that generate four separate signals, commonly called A, B, C, and D. The primary data signal is the sum of the four quad detector signals (A+B+C+D). A radial position error signal, called a Radial Push-Pull (RPP) signal is derived by subtracting appropriate pairs of the quad detector signals, for example (A+D)−(B+C). For media with wobbled grooves, the wobble signal is a high frequency modulation of the relatively low frequency RPP signal. Each of these various signals (primary data signal, radial position error signal, focus error signal, and wobble signal) requires corresponding electronics to extract, decode, and condition one particular signal from a combination of signals from the quad detector.

FIG. 1 (prior art) is a simplified block diagram illustrating typical drive electronics, with a separate channel for each signal. For reading primary data and generating a read clock, an automatic gain control (AGC) amplifier 100 is followed by an appropriate filter 102, followed by a zero crossing detector 103, then a phase-locked-loop (PLL) 106, and a data detector 108. For reading wobble data and generating a write clock, an amplifier 110 is followed by an appropriate filter 112, followed by a zero crossing detector 114, then a phase-locked-loop (PLL) 116, and a data detector 118. From FIG. 1, it can be seen that the channel for reading primary data, and the channel for reading wobble data, have functionally similar blocks. However, specific design parameters are different between the two channels. In order for written data patterns to be precisely aligned relative to the physical wobble patterns, the wobble channel requires minimal phase delay and nonvarying phase delay. In contrast, for the primary data channel, phase delay is of relatively little concern, and the primary design parameter is low noise at the primary data frequency. AGC may introduce variable phase delay, and therefore cannot be used in amplifier 110. Filter 112 is optimized for low-phase-delay, whereas filter 102 is optimized to boost the primary data frequency and to suppress as much noise as possible. Finally, if the wobble frequency is different than the primary data frequency (which is the usual case), then PLL 116 must be designed to run at a different frequency than PLL 106 (that is, the inputs to the PLL's have different frequencies).

Also illustrated in FIG. 1 are channels for a tracking error signal (RPP) and focus error signal. For the tracking error signal, an amplifier 120 and a simple low-pass filter 122 are sufficient. Likewise, for the focus error signal, an amplifier 124 and a simple low-pass filter 126 are sufficient. In general, the tracking error signal and the focus error signal have much lower bandwidths than the wobble clock or the data signal.

There is a general need for cost reduction of the drive electronics.

SUMMARY OF THE INVENTION

The read channel electronics and the wobble channel electronics are combined into one common channel for reduced cost. When the drive is reading, the common channel is used for primary data and a read clock. When the drive is writing, the common channel is used for wobble data and a write clock. Two example embodiments are provided. In each example, a single front end amplifier, without automatic gain control, is used. In each example, a single PLL and a single data detector are used.

DETAILED DESCRIPTION OF THE PREFERRED EMBODIMENT OF THE INVENTION

Figure 1:
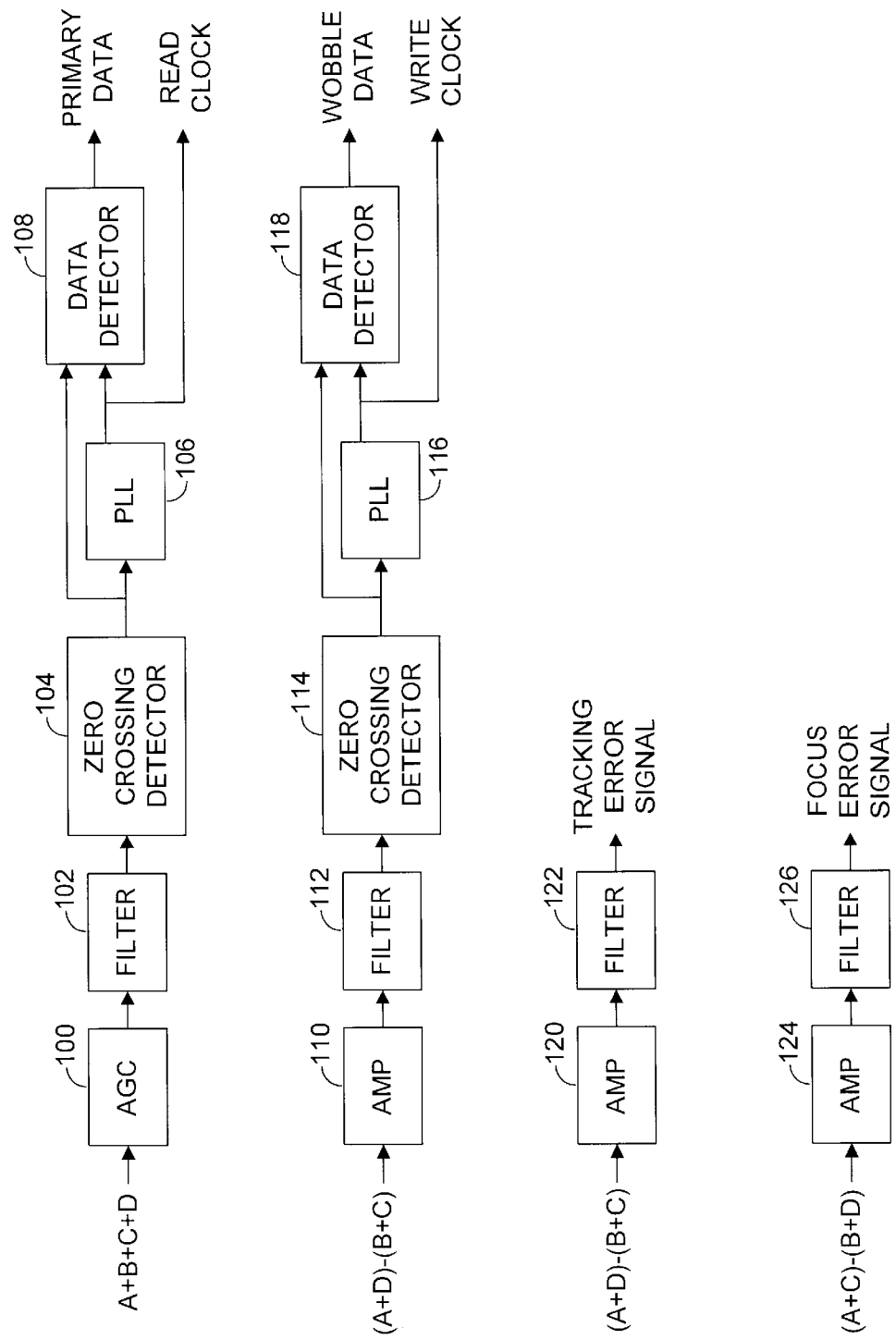
FIG. 1 (prior art) is a block diagram showing the functional electronics blocks for generating various signals in an optical disc drive.
Figure 2:
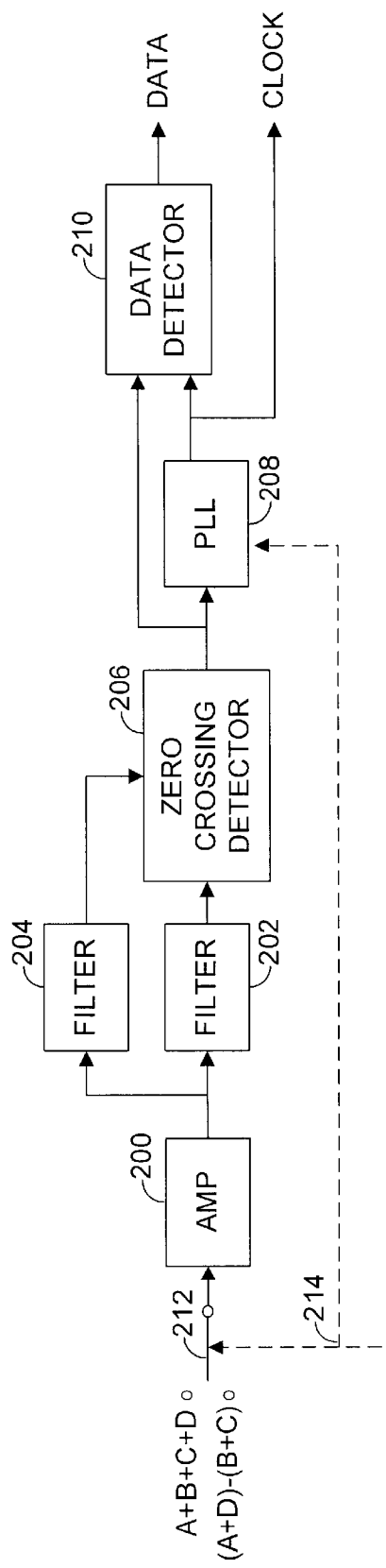
FIG. 2 is a block diagram showing the functional electronics blocks for a combined channel in accordance with a first example embodiment of the invention.

FIG. 2 illustrates a first example embodiment of a single electronics channel for reading primary data from the disc, and for generating a read clock, and for generating a write clock used to write data to the disc, and for reading address data or other data encoded into the wobble of wobble grooves. Recall that the write data clock requires an electronic channel with a low, and nonvariable, delay time. Accordingly, in FIG. 2, amplifier 200 does not have AGC, because AGC adds variable delay time. Filter 202 passes the primary data frequency, and also passes the wobble frequency. Filter 202 includes low pass filtering for reduction of noise above the data and wobble frequencies. Filter 202 also includes "boost" for the higher frequencies of the data signal for improved equalization of the data. That is, the filter 202 makes all the frequencies in the data signal a similar amplitude, which requires a boost of specific higher frequencies that are affected by low pass rolloff. Filter 204 is optional, and may not be necessary. If cross talk with other information causes too much low frequency variation in the midpoint of the output of filter 202, a low pass filter 204 may be used, and the output of filter 204 may be used to vary the threshold level of the zero crossing detector 206. PLL 208 will be discussed in more detail below. Data detector 210 is conventional, latching a binary data signal from the zero crossing detector 206 at an edge of a clock signal from the PLL 208.

Figure 3:
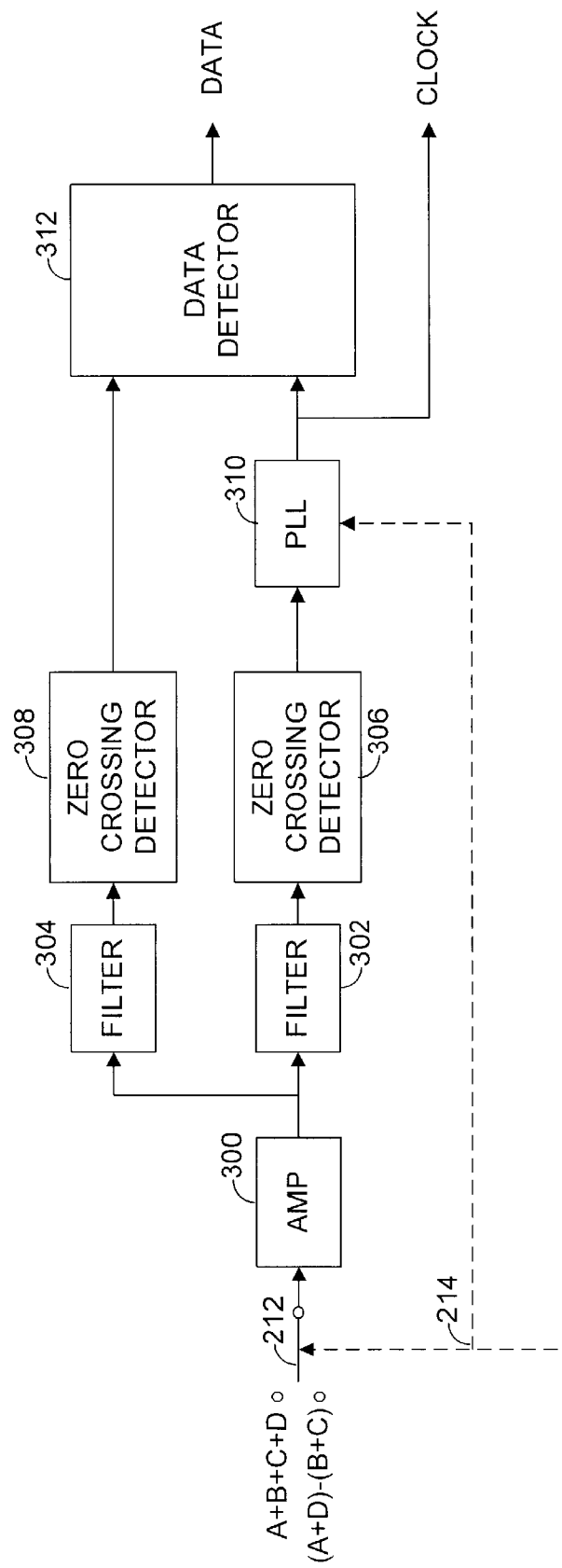
FIG. 3 is a block diagram showing the functional electronics blocks for a combined channel in accordance with a second example embodiment of the invention

FIG. 3 illustrates a second example embodiment of a single electronics channel for reading primary data from the disc, and for generating a read clock, and for generating a write clock used to write data to the disc, and for reading address data or other data encoded into the wobble of wobble grooves. In FIG. 3, amplifier 300 does not have AGC, as discussed in conjunction with amplifier 200 in FIG. 2. Filter 304 passes the primary data frequency, and also passes the frequency of wobble data, and phase delay is relatively unimportant (the primary design parameters are noise reduction outside the frequencies of the data signals, and equalization of the higher frequencies of the data signal). Filter 302 also passes the primary data frequency and the wobble frequency, but must have very little phase delay at the wobble frequency. Data detector 312 is conventional, latching a binary data signal from the zero crossing detector 308 at an edge of a clock signal from the PLL 310.

Figure 4:
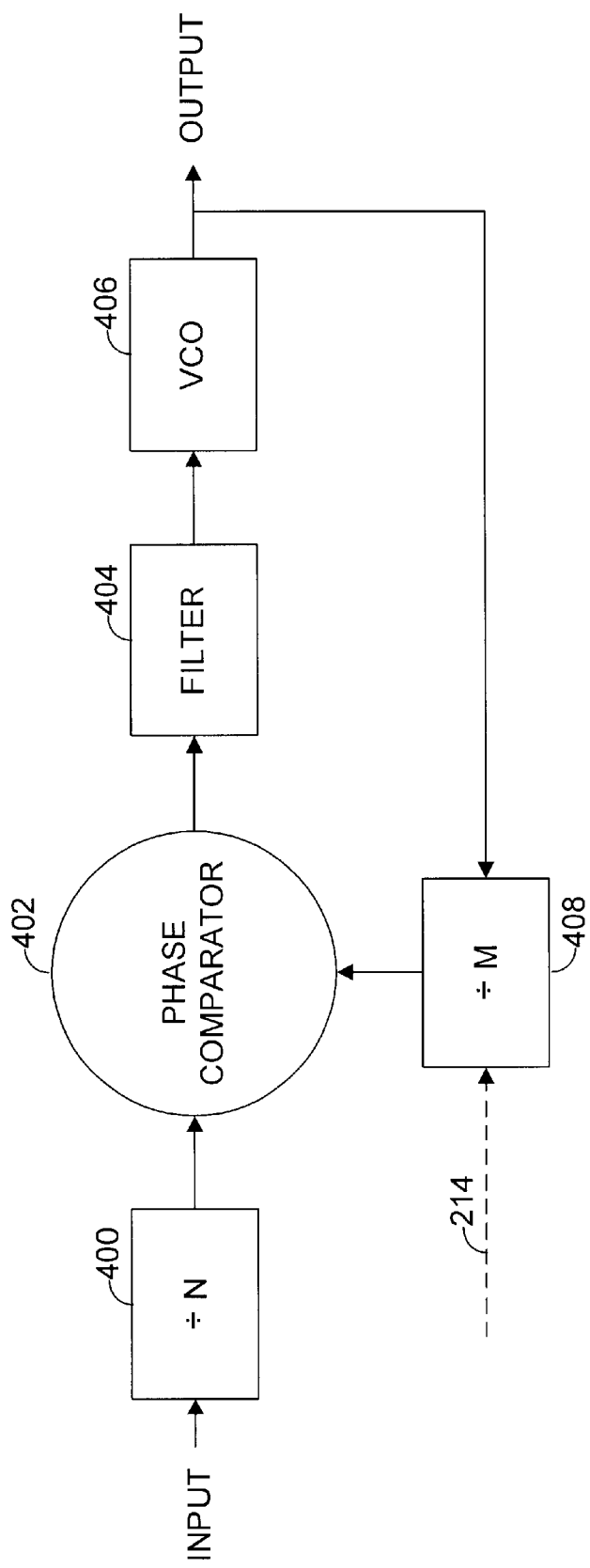
FIG. 4 is a block diagram showing additional detail for a phase-locked-loop illustrated in FIGS. 2 and 3.

FIG. 4 illustrates additional detail for PLL 208 (FIG. 2) and PLL 310 (FIG. 3). The PLL compares the phase of an input signal to the phase of an output signal (phase comparator 402) and generates a phase error signal that is filtered (404). The filtered error signal controls a Voltage Controlled Amplifier (VCO) 408. In general, in a PLL, the input frequency may be divided by an integer N (element 400), and the feedback path may be divided by an integer M (element 408), so that the PLL output frequency is M/N times the PLL input frequency. If, for example, the primary data frequency is 1/6 the frequency of the read clock, for a PLL as in FIG. 4, during reading, N=1 and M=6. For one specific DVD format, the write clock frequency is 32 times the wobble frequency, so that for a PLL as in FIG. 4, during writing, N=1 and M=32. Referring back to FIGS. 2 and 3, a control signal represented by dashed line 214 controls whether a switch 212 connects the input amplifier to the primary data signal or to the wobble modulated RPP signal. In FIG. 4, signal 214 is also used to switch the integer divisor in the PLL feedback path (element 408), for example, to divide by 6 during reading and to divide by 32 during writing.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An electronic read channel for an optical disc drive, the drive adapted for reading and writing data, the channel comprising:

an amplifier, having an input and an output;

a switch, the switch coupling the input of the amplifier to a data signal when the drive is reading data, and the switch coupling the input of the amplifier to a wobble signal when the drive is writing data; and a phase locked loop, receiving a signal derived from a signal from the output of the amplifier, the phase locked loop generating a read clock signal when the drive is reading data, and the phase locked loop generating a write clock signal when the drive is writing data.

2. The electronic read channel of claim 1, further comprising:

a data detector, receiving a signal derived from the signal from the output of the amplifier, the data detector generating a primary data signal when the drive is reading data, and the data detector generating wobble data when the drive is writing data.

* * * * *